July 22, 1958  W. GLASER  2,844,426
TORSION PISTON RING

Filed Oct. 1, 1957  2 Sheets-Sheet 1

INVENTOR.
Wolfgang Glaser
BY
Thomas, Weisman & Russell
ATTORNEYS

July 22, 1958 W. GLASER 2,844,426
TORSION PISTON RING

Filed Oct. 1, 1957 2 Sheets-Sheet 2

INVENTOR.
Wolfgang Glaser
BY
Thomas, Weisman & Russell
ATTORNEYS

United States Patent Office 2,844,426
Patented July 22, 1958

2,844,426

TORSION PISTON RING

Wolfgang Glaser, Burscheid, near Koln, Germany, assignor to Goetzewerke Friedrich Goetze Aktiengesellschaft, Burscheid, near Koln, Germany, a corporation of West Germany Application October 1, 1957, Serial No. 687,473

11 Claims. (Cl. 309—44)

This invention relates to a novel type of sealing means adapted for use in internal combustion engines of either the two-cycle or four-cycle type. The invention is also suitable for use as a packing ring for general purposes, and may be utilized as an oil seal for various mechanisms. The basic type of sealing ring here involved is preferably described as a "torsion ring." This is in contrast to known types of rings used upon gas engine pistons and typically referred to as "tension rings" which rely upon inherent resiliency or what might be termed "spring loading" to attain their sealing function.

The instant application is a continuation in part of my copending application, Serial No. 667,841, filed June 25, 1957.

The basic form of torsion ring, over which this is an improvement, is described in detail in my joint application for patent, Serial No. 560,262, filed January 19, 1956. When referring here to the "basic" form of the torsion ring, it is intended to identify the configuration and general operative features of same as set forth and described in the said application for patent.

In referring first to the torsion ring, as used in internal combustion engines, it is a generally accepted fact that great difficulty has been encountered in the past in the use of the ordinary type of tension ring. This is because such rings are conducive to "fluttering" or "blow-by" as a consequence of their seating in ring grooves considerably larger in cross-sectional area than the ring itself; having substantial back and side clearances between ring and ring groove, such rings, when subjected to the alternate and rapid work and return strokes of e. g., a four-cycle engine, are caused to shift and strike opposite sides of the ring groove. This chattering or fluttering permits the referred-to blow-by with consequent considerable decrease in engine efficiency.

The basic torsion ring of the described type does not inherently possess these disadvantages. This is because such a ring is not of the tension type or one which is spring loaded. It fits relatively tightly within the ring groove, thus preventing blow-by. Its cross-sectional configuration is such that upon the impingement of gases under pressure against the flange part of the ring, the latter is caused to come into tighter contact with the cylinder wall, hence attaining the sealing effect. In other words, the primary functional difference from known types of tension piston rings is that the sealing face of the ring of this invention is not pressed against the cylinder wall or counter-face with constant mechanical pressure, but by the pressure of the medium against one side of the rim or flange part of the torsion ring. It is also a marked advantage of these so-called torsion rings that friction between the two contacting faces (e. g., the cylinder wall on the one hand and the sealing flange of the ring on the other) is low in one direction of movement (during nonworking strokes of the piston) while in the opposite direction, the sealing pressure of the flange against the wall and consequently the sealing effect, is materially increased by the pressure of the medium acting upon the ring. This obviously results in a saving of energy in one direction of movement and a better utilization of energy in the other, thus minimizing energy losses which are present in the use of the ordinary type of tension piston ring.

It is, of course, essential that the torsion ring be, in part at least, fabricated of a material which is resilient, elastic or flexible. Such material must possess a definite amount of springiness for under operative conditions, the wall contacting the flange part of the ring, when subjected to gaseous pressures, is twisted or torsioned into tighter contact with the cylinder wall and this twisting comes about through such natural resilience of the metal employed. In the instant improvement, however, it has been found that if the major portion or a substantial portion of the ring is made of such resilient or elastic metal, of whatever type, the ring will be even more efficient in its performance if certain of the contacting or sealing surfaces are provided with an insert, covering or addition of softer metal. The result is to provide a ring wherein the harder material assures consistency of shape of the ring, or its permanent flexibility, while the softer material achieves the desired sealing effect with much more efficiency.

In its more general and broader aspects, it is to be understood that this invention contemplates the use of such a ring in various and different applications. In other words, the basic concept may be applied to any type of sealing function involving the sealing of a cylindrical surface. In this sense, the ring is most suitable for use as an oil seal. Furthermore, as herein defined, and either in this specification or in the claims appended hereto, when reference is made to relatively hard or relatively soft materials, it is intended that a variety of such materials be included. For example, in its general use as a packing ring, and aside from its more particularized use as a piston ring, it is to be understood that fabrication of a variety of materials, including synthetics, plastics, natural and synthetic rubber and the like, is contemplated, and in this more generalized aspect the ring structure likewise contemplates a back part with circular section and an outwardly annexed rim part inclined towards the chamber of higher pressure, i. e., towards the chamber to be sealed. In every usage the circular back part of the ring is positioned in a groove of circular section at its bottom, and the outer circumference of the ring attains the sealing effect by pressing against the cylindrical surface. Again, in this more generalized aspect, it is similarly true, as in the instance of its use as a piston ring, that the sealing effect of the ring is different from that of other types of packing rings, inasmuch as the sealing face is not pressed against the counter-face with constant mechanical pressure, but in major part by the pressure of the medium to be sealed acting upon one side of the rim or flange part. In these broader aspects, it is also true that such a sealing means exhibits a marked advantage in that friction by the sealing faces is low in one direction of movement while in the opposite direction, the sealing pressure and consequently the sealing effect is materially increased by the pressure of the medium acting upon the ring.

Accordingly, it is a primary object of the invention to provide a torsion piston or sealing ring of the described type wherein the resilient or elastic portion thereof is made of a hard material to permit flexing thereof and return to shape, and the sealing, contacting portion of the ring (either with respect to the cylinder wall, the back side of the ring groove or both), is made of a softer metal or material.

It is a further objective of the invention to provide a ring of the torsion type wherein the soft metal may entirely surround the ring itself except for a wall contacting portion of the flange or may be incorporated on or in the flange only to aid in the sealing effect.

Another object of the invention is to provide a composite ring of the described type that takes advantage of both the superior sealing qualities of a softer metal and the inherent flexibility and springiness of a relatively hard material.

A further object of the invention is to provide a ring of the described type which may be made of various optional metals or even synthetic materials provided they consistently and respectively exhibit these two relative qualities of either a soft contacting surface and a relatively hard, supporting, basic element, or a basic ring of hard, resilient material provided with an even harder material at the contacting surfaces thereof.

A further object of the invention is the provision of a piston ring of the torsion type which is not only suitable for use as a compression ring, particularly with respect to two-cycle engines, but is readily adaptable for use also as an oil ring.

There are other objects and advantages of this invention which will be readily perceived from the following detailed explanation, and having reference to the accompanying drawings in which.

Figure 5:
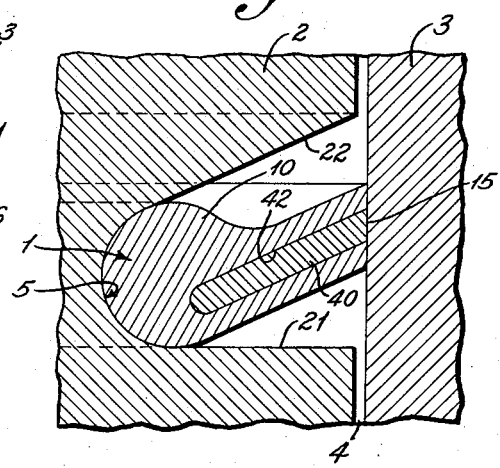
Figure 6:
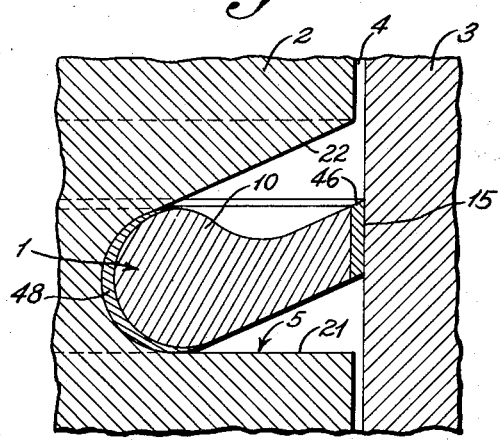

Figure 5 is an enlarged sectional view of an additional embodiment of the invention wherein the harder material is inserted in a peripheral groove cut in the flange portion of the ring, the body portion and flange of the ring being made, in this example of the invention, of the softer material; and Figure 6 is an enlarged view of an additional embodiment of the invention whrein a relatively hard material is adhered to two opposed surfaces (in cross section) of the ring, the ring groove contacting portion having its surface covered with the harder materials and, likewise, the end of the flange or sealing edge having its portion covered with a relatively harder material.

Figure 1:
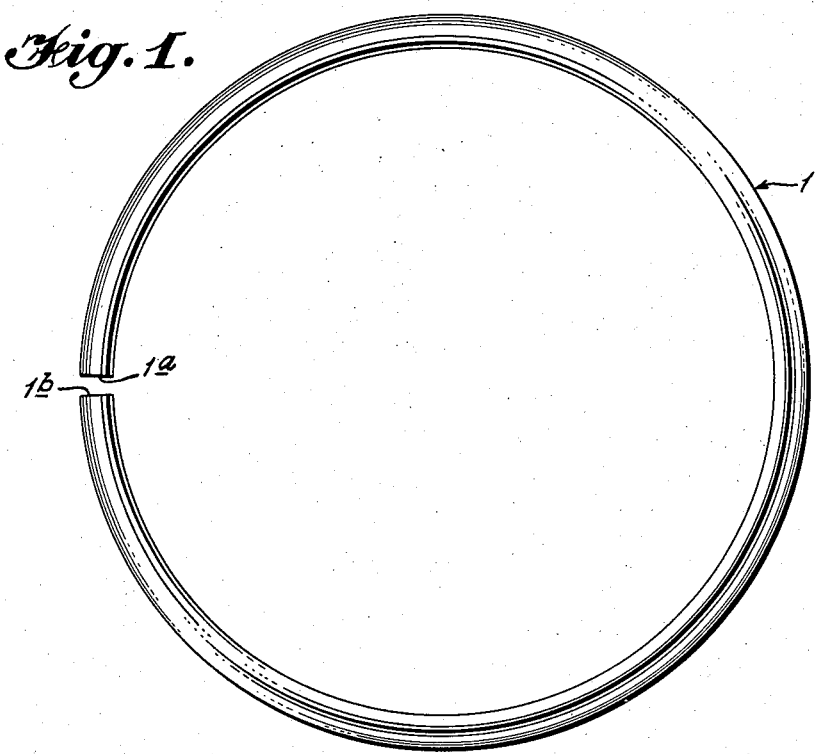
Figure 1 is a top plan view of the piston ring comprising the invention.

Referring more particularly to the above-designated figures, it is seen that in Figure 1, the ring is generally indicated at 1. It is of the so-called split ring type having two opposed ends 3 and 5 which, after positioning of the ring upon the piston, are separated an amount sufficient to permit expansion of the ring at elevated temperatures without binding.

The basic torsion ring is annular and consists of a main body portion 10 which graduates into a flange or extension 12. Such main body portion 10, as indicated by the dotted line 11, is substantially circular in cross-sectional configuration or at least the major portion thereof is. The flange 12, on the other hand, may be described as frusto-conical; it is the element of the ring which is most flexible and the terminal end 15 thereof is adapted to contact the cylinder wall in sealing relationship.

Figure 2:
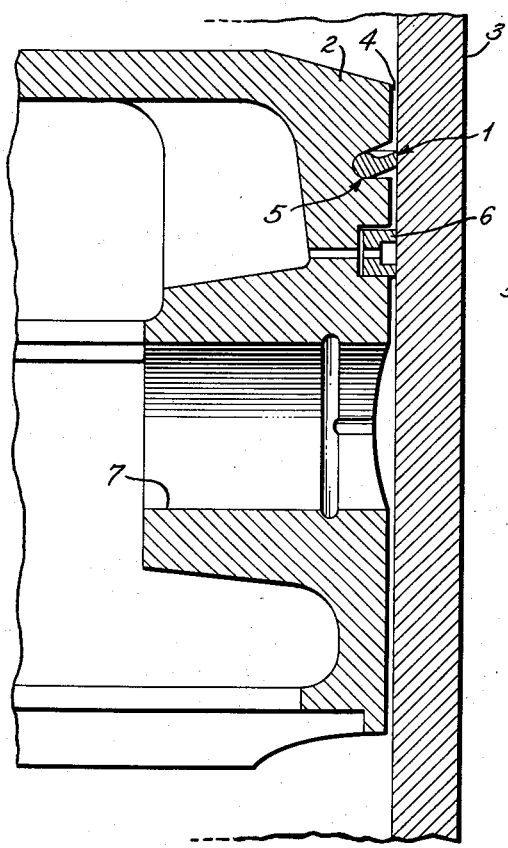
Figure 2 is a sectional view of the torsion ring as it is positioned on a piston of known type and depicting the flange in sealing relationship with the cylinder wall.

In Figure 2, the ring 1 is indicated as being positioned in a suitable ring groove in the piston 2, the latter being fitted within an appropriate bore in the cylinder wall 3 in usual fashion with, as is customary, a suitable clearance 4 between the piston and the cylinder wall 3. As shown in Figure 2, the piston may be optionally fitted with an additional oil sealing ring 6 of usual type. And taking the normal type of piston as an example, the latter is bored as at 7 for insertion of the usual type of wrist pin.

In the representation of the ring in Figures 3 to 6, inclusive, is found the improvement of this invention, and the various preferred embodiments thereof which, as stated, substantially increase the sealing efficiency of this type of torsion ring. More detail is shown in these figures as to the actual construction of the basic form of torsion ring, and more detail is illustrated as to the inserts of softer, or alternatively, harder metal which add to the performance of the ring.

Accordingly, it is seen that in cross section and as illustrated in all four of these figures, the flange 12 includes upper and lower edges 13 and 16, respectively, the lower edge representing a surface which is in a plane substantially tangent to the circle, indicated in dotted line at 11, of the main body portion 10.

Figure 3:
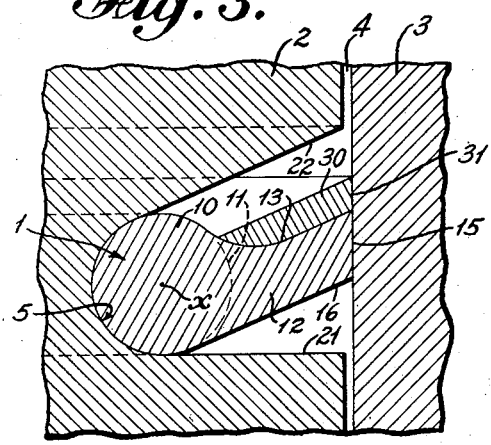
Figure 3 is an enlarged sectional view of the engine illustrating an embodiment thereof wherein the softer material is adhered to the top of the flange part of the ring.
Figure 4:
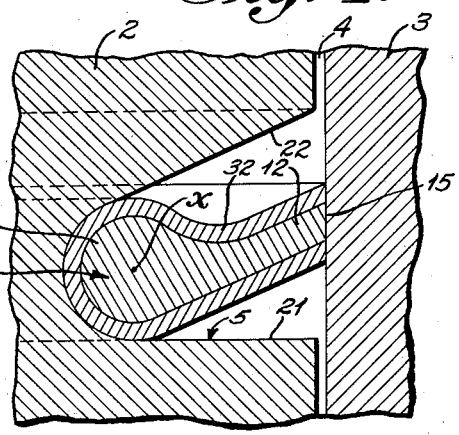
Figure 4 is an enlarged sectional view of another embodiment of the invention wherein the softer metal or material surrounds the entire torsion ring except for the end of the flange or the portion thereof which contacts the cylinder wall.

The cylinder wall contacting portion 15 of the flexible flange 12 is of a thickness, as shown in Figure 3, which amounts to about three-fourths of the radius of the circular portion, in cross section. In Figure 4 this is less but in Figures 5 and 6, this thickness is of approximately the same amount. The contacting portion 15 of the flange is preferably cut upon a plane which is parallel to a vertical line drawn through the central axis X of this main body portion 10 of the piston torsion ring.

The lower edge 12 of the flange in the preferred form of the basic torsion ring is angled at about 30° to a horizontal plane passing through the axis X. Moreover, in the preferred embodiment of the invention involved in the basic form of torsion ring, such contacting face 15 terminates at its lower edge at a point which is above a plane passing laterally through this center of rotation X. Such construction of the flange with the major portion of the contacting face thereof appreciably above the referred to lateral axis, prevents binding of the ring as a result of pressures extended downwardly upon the flange 12. Hence, the relative positioning of the flange 12 and contacting face 15 of the basic form of torsion ring is significant.

The annular sealing ring is, of course, mounted in an appropriate ring groove 5 formed in the piston. As herein shown, such ring groove has a bottom wall 21 that may be considered as being in a lateral plane whereas the upper wall 22 is angled substantially to the bottom wall and, as here shown, is at an angle of approximately 25° to the wall 21. The upward angle of the top wall 22 of the ring groove 5 thus facilitates positioning of the torsion ring in the ring groove.

From the foregoing, the operation of the basic form of torsion ring should generally be understood to be as follows: in inactive position, or not under the influence of gaseous pressure, the flange 12 does not bear tightly against, e. g., the cylinder wall 3, but upon the impact of pressure against this flange of the ring, the flange 12 does bear tightly, the ring turning about the center of rotation X so that the bearing face 15 of the flange is pressed into tight, sealing contact with the cylinder wall. Due to the resultant counter pressure, the back part of the ring is similarly pressed against the bottom of the ring groove 5, thus maintaining a seal in that region. Due to slight axial play and to good heat transfer through the ring to the cylinder, piston temperatures will consequently remain low. And as stated, although there is a tight contact during the working stroke, since on the return stroke there is but relatively light contact with the surface to be sealed, the involved frictional forces are substantially reduced.

The instant invention obtains all of the advantages set forth with respect to the basic type of torsion ring which has been described above. In addition, however, the sealing function is increased to even a greater degree when the torsion ring is made out of materials having varying degrees of hardness. It is to be understood that the harder material insures the consistency of shape which is necessary while the softer material exhibits more effectiveness insofar as sealing contact is concerned. Good results have been obtained when the flange part of a torsion ring is made of hard material and the same covered on one side, preferably that side turned towards the pressure to be sealed, by a layer of soft material extending up to and adjacent to the sealing face of the flame. Similar advantages are obtained when both the upper and lower sides of the flange portion are covered by a layer of softer material and, in the latter instance, a variation employed has been to connect these upper and lower layers by covering the circular main body portion of the ring or that portion contacting the base of the ring groove. In any of these instances, the harder material permits the ring to bend under pressure and return to its original shape with a better sealing surface due to the use of the softer contact material.

It has been found that other variations improve the basic torsion ring in its functional aspects. For example, the main body portion of the ring can be made of a soft material or relatively soft material with the flange part stiffened by an insert of very hard material. On the other hand, the flexibility of a ring made of a relatively hard material may be improved by radially subdividing the ring or its part or parts. In this case the outer ring part, i. e., the rim or flange, is not stretched as strongly as an undivided one under specific pressure on the counter-face. A loss of pressure is avoided since such slits may be covered by an uninterrupted layer of soft material.

In fabrication of this type of improved torsion ring where materials of varying hardness are employed, it is contemplated that when speaking of harder materials would generally be meant steel or cast iron. On the other hand, the employed softer materials could be in the nature of nonferrous alloys, such as brass or elements such as tin.

In the description that follows, it should be understood that various methods may be employed to join these materials together in a permanent and secure fashion. Reference is here made to such methods as fusing, brazing, alloying or even plating.

Reference is now made to Figure 3 illustrating an embodiment of the invention wherein an insert 30 of a relatively soft material, such as brass, is fused to the upper side of flange part 15. This layer is formed with a sealing face 31 that lies in the same plane, and is adjacent to, or abuts, the face 15 of the flange portion of the ring itself.

In the embodiment of Figure 4, the layer 32 of softer material surrounds the entire ring enclosing the flange with the exception of the sealing face 15 of the flange and, here again, the softer material at the contact face thereof lies in the same plane as, and abuts, the face 15 of the flange part of the ring. In this instance, the cross-sectional dimension of the ring itself is reduced in diameter to accommodate such a layer 32 in order that the overall size of the coated or covered ring remains in the same proportion as the ring shown in Figure 3.

In Figure 5 a construction in reverse to that of Figure 4 is shown: here the main body portion 10 of the ring as well as the flange are made of the softer material such as brass, whereas an insert 40 secured to an appropriate groove 42 in the flange part is fabricated of a substantially harder material, such as spring steel, to impart to this flange portion the required flexibility. Here it is seen that the cylinder wall contacting edge of the insert 42 terminates in the same plane as the plane of the abutting contacting surfaces of the ring itself. Such presents a smooth sealing surface of laminated formation to the cylinder wall.

A construction somewhat similar to that of Figure 5 is found in Figure 6 in the sense that the main body portion 10 of the basic torsion ring is fabricated of the softer material whereas the face 46 of the flange and the ring groove contacting portion 48 of the ring itself are both fabricated of a harder material. In this instance, it is contemplated that the basic torsion ring 10 be fabricated of comparatively hard material, such as steel, but that these portions 46 and 48 be made of even harder and longer-lasting materials, such as tool steel, tungsten, etc. In this instance, therefore, the main body portion of the ring, as in the embodiments of Figures 3 and 4, would be the resilient portion and the coverings referred to would comprise the ring groove and cylinder wall contacting surfaces. Being of extremely hard material, such contacting surfaces will exhibit longer life as well as provide improved sliding surfaces in these regions.

From the foregoing discussion, it will be appreciated that the basic type of torsion ring has been substantially improved with respect to durability, functionality, and efficiency by fabricating the ring of materials of different relative hardness. On the one hand it has been found, and as stated above, that if the contact surface of the flange portion of the ring is provided with a lamination or insert of softer metal or material, the sealing effect of the flange portion of the ring is substantially and materially increased. In its other aspect, and assuming that the material out of which the main portion of the ring is made is of a metal that is inherently flexible or resilient, the wearing surfaces can be improved by the addition of a lamination or coating of materially harder metal.

In either instance the basic performance and functions of the torsion ring are retained. By this is meant that in operation, the resilient flange of the ring permits use of combustion gases under pressure as a means for increasing the tightness of contact between the face of the flange and cylinder wall. This increased sealing effect is obtained through the twisting of the ring, viewed in cross section, resultant upon the force with which such gases under pressure impinge upon the upper surface of the flange part of the ring.

I claim:

1. A sealing ring element having in cross section an approximately semicircular support engaging portion, a centrally located center of rotation in said portion, said portion graduating to an extended flange of a material and proportion as to flex about said center and provided with a cylindrical wall contacting face, said face having at least a portion thereof made of a material softer than the material of said flange, the greater portion of said face being positioned to one side of a lateral plane running through said center of rotation.

2. A sealing ring element having in cross section an approximately semicircular support engaging portion, a centrally located center of rotation in said portion, said portion graduating to an extended flange of a material and proportion as to flex about said center and provided with a cylindrical wall contacting face, the upper side of said flange having a metal softer than said material bonded thereto, said softer metal abutting said face and contacting said cylindrical wall, the greater portion of said face being positioned to one side of a lateral plane running through said center of rotation.

3. A sealing ring element having in cross section an approximately semicircular support engaging portion, a centrally located center of rotation in said portion, said portion graduating to an extended flange of a material and proportion as to flex about said center and provided with a cylindrical wall contacting face, a coating of material softer than said first-named material about the entire surface of said ring except said face, said softer material abutting said face and being adapted for sealing contact with said cylindrical wall on each side of said face, the greater portion of said face being positioned to one side of a lateral plane running through said center of rotation.

4. A sealing ring element having in cross section an approximately semicircular support engaging portion, a centrally located center of rotation in said portion, said portion graduating to an extended flange of a material and proportion as to flex about said center and provided with a cylindrical wall contacting face, said extended flange being provided with an insert of a material harder than said first-named material, said insert abutting said face and being in contact with said cylindrical wall, the greater portion of said face being positioned to one side of a lateral plane running through said center of rotation.

5. A piston ring element having in cross section an approximately semicircular piston engaging portion, a centrally located center of rotation in said portion, said portion graduating to an extended flange of a material and proportion as to flex about said center and provided with a cylinder wall contacting face, a lamination of a metal harder than said material adhered to said face, and a lamination of said harder material adhered to said semicircular piston engaging portion, the greater portion of said face being positioned to one side of a lateral plane running through said center of rotation.

6. A piston ring element having in cross section an approximately semicircular piston engaging portion, a centrally located center of rotation in said portion, said portion graduating to an extended flange of a material and proportion as to flex about said center and provided with a cylinder wall contacting face, said face having at least a portion thereof made of a material harder than the material of said flange, the greater portion of said face being positioned to one side of a lateral plane running through said center of rotation.

7. Packing ring with a back part of circular section and an outwardly annexed rim part inclined towards the side face exposed to higher pressure, particularly towards the chamber to be sealed, the outer circumference of said rim part forming the sealing and sliding face of the ring, chracterized in that the ring consists of two connected parts made of materials with different hardness.

8. Packing ring according to claim 7, characterized in that the rim of the ring made of hard material is covered at one side, preferably at the side exposed to higher pressure, by a layer of soft material extending up to and into the sliding face of the ring.

9. Packing ring according to claim 7, characterized in that the rim of the ring made of hard material is covered on both sides by a layer of soft material extending up to and into the sliding face of the ring.

10. Packing ring according to claim 7, characterized in that an insert of hard material forming part of the outer circumference stiffens the rim part of a ring consisting of soft material.

11. Packing ring according to claim 7, characterized in that the sliding surface of the ring made of soft material is covered by a layer of hard material.

No references cited.